3,362,721
EXPANDABLE MANDREL
James R. Buck, Rose Township, Kalamazoo County, Mich., assignor to Buck Tool Company, Kalamazoo, Mich., a corporation of Michigan
Filed Oct. 30, 1964, Ser. No. 407,744
7 Claims. (Cl. 279—2)

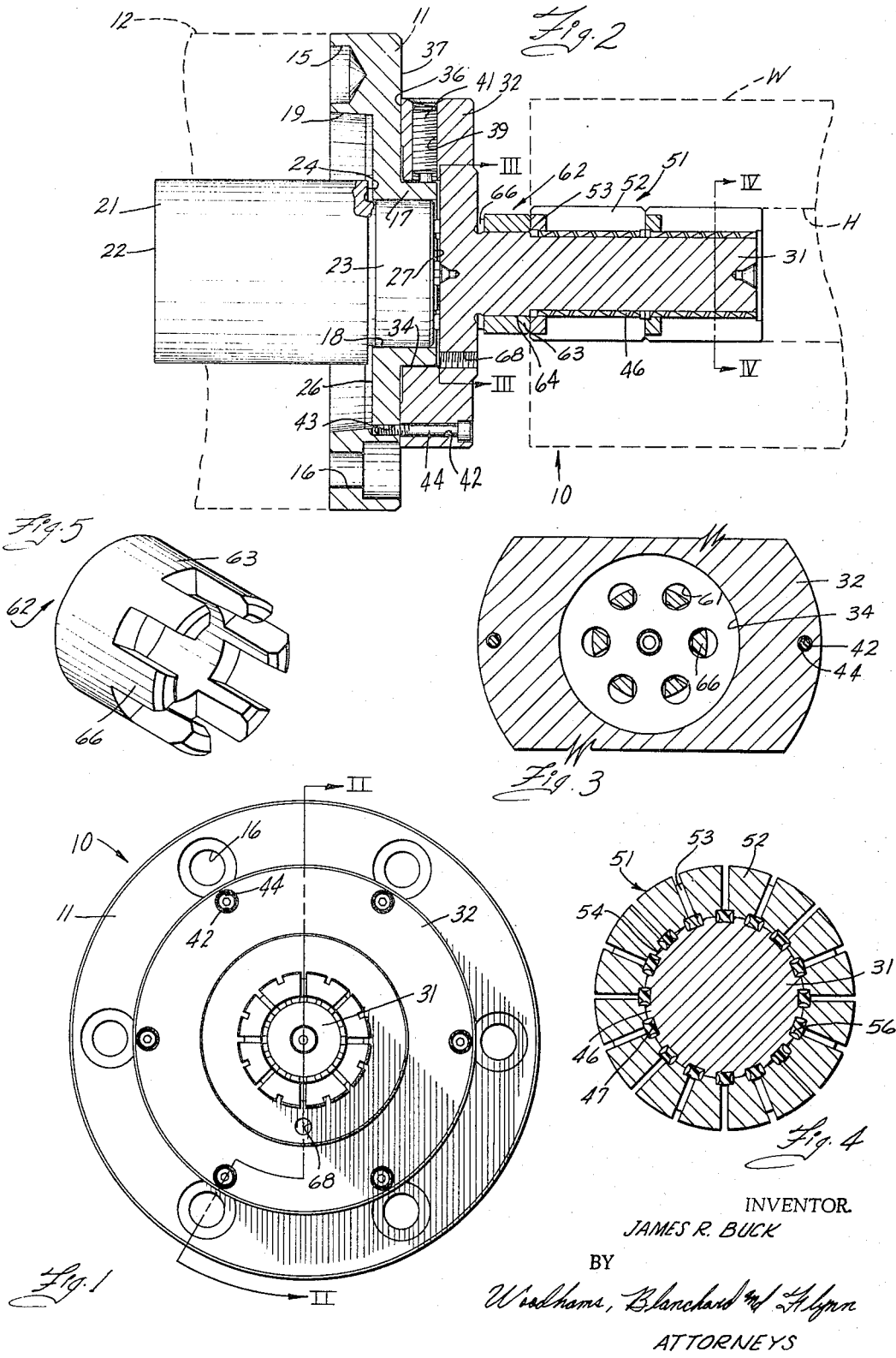
Jan. 9, 1968    J. R. BUCK    3,362,721
EXPANDABLE MANDREL
Filed Oct. 30, 1964
INVENTOR.
JAMES R. BUCK
BY
Woodhams, Blanchard and Flynn
ATTORNEYS

This invention relates to an expandable work piece holder construction and more particularly relates to an expandable mandrel including a radially expandable sleeve movable axially by a plurality of circumferentially spaced elements.

Expandable mandrels are known in the art wherein an axially slotted sleeve is provided with axially aligned and sloped internal ramps for bearing on corresponding external ramps of an arbor coaxially contained within the sleeve. Radial expansion of the sleeve is achieved by relative axial movement of the sleeve and arbor in the proper direction. An example of such an expandable mandrel is disclosed in my United States Patent No. 3,117,797.

In certain cases it has been found desirable to maintain the arbor in an axially fixed position and to move the external sleeve axially therealong to effect expansion thereof. This has led to certain difficulties when the means mounting the arbor lie between and impede interaction between the expandable sleeve and the actuating means therefor. Such difficulties exist, for example, where the arbor is mounted by an integral flange upon the spindle of a lathe which flange interferes with movement of the sleeve by the push bar of the lathe. Prior art solutions to this problem, as far as I am aware, have involved either mechanisms of excessive complexity and, hence, expense or have resulted in substantially weakening the mounting of the expandable mandrel on the lathe spindle.

A similar problem has occurred when the expandable sleeve is to be energized by a draw bar rather than a push bar but again wherein some means such as additional work piece positioning means has interfered with unrestricted contact between the sleeve and draw bar actuated means which are to actuate the sleeve.

Accordingly, the objects of this invention include:

(1) To provide an expandable mandrel in which an expandable sleeve is axially slideably mounted on an arbor by coacting ramp means on said arbor and sleeve in which said sleeve expands radially upon relative axial movement between said sleeve and arbor.

(2) To provide an expandable mandrel, as aforesaid, in which the arbor is mountable for rotation with the spindle of a lathe, in which said sleeve is axially movable along said arbor by axially reciprocable bar means at the end of said arbor, and in which said reciprocable bar means is connected to said sleeve by transfer means located therebetween.

(3) To provide an expandable mandrel, as aforesaid, in which said transfer means is urged by said reciprocable bar against an end of said sleeve at a plurality of circumferentially evenly disposed points for maintaining the sleeve coaxial with the arbor to assure uniform expansion of said sleeve.

(4) To provide an expandable mandrel, as aforesaid, which allows energization of said sleeve by said transfer means despite the presence of a radially extended flange on the arbor between the sleeve and bar, in which said actuation is achieved in a manner which does not significantly weaken said flange and in which means are provided for locating said transfer means against unintended radial and circumferential movement.

(5) To provide an expandable mandrel, as aforesaid, in which means are readily provided for precisely positioning a work piece axially upon said expandable mandrel and in which said means may be affixed to the free end of the armor without interfering with the actuation of the sleeve by said bar.

(6) To provide an expandable mandrel, as aforesaid, which can be manufactured economically by relatively simple machining operations and from a relatively small number of parts, which can be accurately made in either large or small sizes at relatively low cost, which can be made in either long or short axial lengths and in which the expandable sleeve can be readily and quickly changed and replaced by a corresponding sleeve having the same or a differing relaxed exterior diameter.

(7) To provide an expandable mandrel, as aforesaid, which can be made sufficiently sturdy as to provide a relatively long and trouble-free service life, which is readily disassembled for repairing and the like and which may be readily maintained by relatively unskilled personnel.

Other objects and purposes of this invention will be apparent to persons acquainted with apparatus of this general type upon reading the following specification and inspecting the accompanying drawings.

In the drawings:

FIGURE 1 is a front elevational view of an expandable mandrel construction embodying the invention.

FIGURE 2 is a sectional view substantially as taken on the line II—II of FIGURE 1.

FIGURE 3 is a fragmentary sectional view taken on the plane of line III—III of FIGURE 2.

FIGURE 4 is a sectional view taken on the line IV—IV of FIGURE 2.

FIGURE 5 is an oblique view of the transfer member of the mandrel of FIGURE 1.

Certain terminology will be used in the following description for convenience in reference only and will not be limiting. The words "rightwardly" and "leftwardly" will designate directions of the drawings to which reference is made. The words "forwardly" and "rearwardly" will refer to directions along the rotational axis of the mandrel construction, "forwardly" indicating the direction (rightwardly in FIGURES 2 and 7) in which the mandrel construction extends from the spindle and "rearwardly" indicating the opposite direction. The words "inwardly" and "outwardly" will refer to directions toward and away from, respectively, the geometric center of the device and designated parts thereof. Said terminology will include the words above specifically mentioned, derivatives thereof and words of similar import.

*General description*

In general, the objects and purposes of the invention are met by providing an expandable mandrel construction including an integral radially extending flange securable to the spindle of a lathe. At least one expandable sleeve is supported on the arbor by coacting ramps so that axial movement of the sleeve on the arbor results in radial expansion of the sleeve. The lathe is provided with a reciprocable bar such as the draw bar or push bar which is accessible through the spindle of the lathe. Transfer means including a plurality of axially extended fingers extends between the bar and sleeve for moving the sleeve axially in response to axial movement of the bar. Means are provided on the arbor for radially and circumferentially positioning the fingers.

*Detailed description*

The mandrel construction 10 (FIGURE 2) embodying the invention includes a circular mounting plate 11 mountable on any desired support means such as, for example, the lathe spindle indicated in broken line at 12. A plurality of counter sunk holes 16 (FIGURES 1 and 2) are evenly circumferentially spaced on and extend rearwardly through the mounting plate 11 near the periphery thereof for receiving suitable screws, not shown, by which the mounting plate 11 is affixed to the lathe spindle 12. An eccentric recess 15 in the rear face of the mounting plate 11 allows positive driving of said plate 11 by a suitable drive pin, not shown, on the lathe spindle 12. An integral, cylindrical boss 17 extends forwardly from and is coaxial with the mounting plate 11. A cylindrical central opening 18 extends through the mounting plate 11. The mounting plate 11 has a coaxial, rearwardly opening and substantially cylindrical recess 19 therein which communicates with the central opening 18 for receiving a suitable pilot, not shown, on the lathe spindle 12 for maintaining the mounting plate 11 coaxial with the lathe spindle 12. In the particular embodiment shown, the peripheral wall of the recess 19 diverges slightly toward the rear thereof to accept a tapered pilot.

A substantially cylindrical reciprocable member or push block 21 of circular cross-section is supported for axial movement by any convenient means, not shown. The push block 21, in the particular embodiment shown, has a substantially planar rear (leftward as seen in FIGURE 2) face 22 against which any convenient actuating means, for example, a lathe push bar, not shown, may act to energize the mandrel 10. The push block 21 has a cylindrical front portion 23 integral and coaxial therewith which is of reduced diameter to define a forwardly facing shoulder 24. The front portion 23 snugly but slideably fits within the central opening 18 of the mounting plate 11, excessive forward motion of the push block 21 being limited by contact between the shoulder 24 and the radial wall 26 of the recess 19 in the mounting plate 11. The front portion 23 of the push block 21 has a radial front face 27.

An axially elongated arbor 31 has an integral, radially extending annular member or flange 32 at the rearward end thereof. The flange 32 has a substantially cylindrical rearwardly opening and coaxial recess 34 of slightly greater diameter and axial length than that of the boss 17. When the boss 17 is fully inserted into said recess 34, the rearward radial face 36 of the flange 32 substantially continuously contacts the forward face 37 of the mounting plate 11 to insure parallelism of the axes of the arbor 31 and mounting plate 11. A circumferentially evenly spaced plurality of threaded holes 39 extend radially between the recess 34 and the periphery of the flange 32. Adjusting screws 41 are threadedly adjustable in the holes 39 and bear at their inner ends on the boss 17 for positioning the flange 32 concentrically with the mounting plate 11. The flange 32 is provided with a circumferentially spaced plurality of axially extending and counter sunk holes 42 which register with corresponding axial threaded openings 43 in the forward face 37 of the mounting plate 11. Mounting screws 44 extend through the holes 42 and threadedly engage the openings 43 for rigidly affixing the flange 32 to the mounting plate 11. Thus, the flange 32 and arbor 31 are mountable on and coaxially with the mounting plate 11.

The rightward end of the arbor 31 has a plurality of axially extending toothed ridges 46 (FIGURES 2 and 4) evenly spaced by a plurality of axially extending grooves 47. The several teeth or ramps of each of the ridges 46 have relatively shallow rearwardly facing slopes and relatively steep forwardly facing slopes. At least one, and in the particular embodiment shown in FIGURE 2, two expandable sleeves 51 are substantially coaxially disposed upon the arbor 31. It has been found that a plurality of relatively short sleeves 51 in series may be preferable to a single long sleeve particularly with respect to ease of manufacture. The sleeves 51 are preferably identical and will be considered for purposes of illustration only to be substantially similar to the expendable sleeve disclosed in my United States Patent No. 3,117,797, filed May 2, 1962. Briefly, the sleeves 51 are each axially slotted at evenly spaced circumferential locations to define a plurality of bars 52. Each pair of bars 52 is connected at one end by an integral web 53, succeeding webs 53 appearing at alternating axial ends of said bars 52 for allowing substantially uniform radial expansion of the sleeves 51. Each of the bars 52 has a toothed ridge 54 extending axially along the radially inner surface thereof. The number, circumferential spacing and, hence, width of the toothed ridges 54 and 46 corresponds in such a manner that angular adjustment between the sleeves 51 and arbor 31 allows said sleeves to be telescoped over the arbor 31, although the ridges 46 and 54 occupy substantially the same range of radii, without interference between said ridges 46 and 54. The teeth or ramps of the ridges 46 and 54 have complementary shapes whereby a small angular displacement of the sleeves 51 on the arbor 31 intermeshes the teeth of the toothed ridges 46 and 54 as shown in FIGURES 2 and 4 whereby forward movement of the sleeves 51 on the arbor 31 results in expansion of the sleeves 51.

If desired, one or more locking keys 56 may be axially inserted into the spaces between the interengaged toothed ridges 46 and 54 to positively maintain such engagement. In the particular embodiment shown at FIGURE 4, the keys 56 are made of a resilient material such as an elastomeric plastic or rubber and the number thereof corresponds to the number of toothed ridges 54 whereby the keys 56 prevent penetration of dust radially inwardly past the bars 52 and into the areas of contact between the ridges 54 and 46. Each sleeve 51 together with the toothed ridges 46 and grooves 47 of the arbor 31 as well as the keys 56 may be substantially similar to corresponding parts disclosed in my afore-mentioned Patent No. 3,117,797.

A plurality, here six, of circumferentially evenly spaced, axially aligned passages or openings 61 (FIGURE 3) communicate between the recess 34 and the forward face of the flange 32. The openings 61 are radially adjacent to the peripheral surface of the arbor 31. The openings 61 are axially aligned with points on the radial face 27 of the push block 21. A cylindrical transfer member in the form of a finger assembly 62 includes a substantially tubular portion 63 which is snugly but slidably disposed upon the midportion 64 of the arbor 31 located between the flange 32 and the toothed ridges 46. The toothed ridges 46 are preferably of no greater radial extent than the midportion 64 to allow removal and replacement of the transfer member 62 on the arbor 31. The axial extent of the tubular portion 63 is somewhat less than the distance between the flange 32 and the closest one of the sleeves 51 for allowing contraction of said sleeves 51.

The transfer member 62 includes a circumferentially evenly spaced plurality of fingers 66 which extend axially rearwardly from the tubular portion 63, said fingers 66 preferably being integral with said tubular portion 63. The fingers 66 are of substantially trapezoidal cross-section, the outer, major base of said trapezoidal section being a continuation of the peripheral surface of the tubular portion 63. The fingers 66 are preferably formed by parallel walled slots cut in a rearward extension of the tubular portion 63. The fingers 66 are snugly but slidably receivable through the openings 61 in the flange 32 and are supported therewithin upon the four axial edges thereof. The rearward ends of the fingers 66 contact the forward face 27 of the push block 21 which when the sleeves 51 are contracted lies rearwardly spaced from radial face of the recess 34 as shown in FIGURE 2. Thus, forward movement of the reciprocable member or block 21 causes a corresponding forward movement of the sleeves 51 by means of the transfer member 62 disposed therebetween, which movement causes expansion of said sleeves. The outer diameter of the transfer member 62 is preferably less than that of the sleeves 51 so that said transfer member 62 will not interfere with positioning of a work piece on the mandrel 10.

*Operation*

A work piece W indicated in broken lines at FIGURE 2 has a central opening H which is slightly larger in diameter than the contracted sleeves 51 but is less than that to which the sleeves 51 can be expanded. The work piece W may be emplaced on the mandrel 10 by insertion of the arbor 31, with the sleeves 51 contracted, into the opening H therein. The work piece W may be moved into contact with the flange 32, if desired, or may remain axially spaced therefrom as indicated in FIGURE 2. A threaded opening 68 extends axially into the forward face of the flange 32 for supporting a suitable adjustable abutment, not shown, for limiting the rearward movement of the work piece W so as to more easily allow positioning thereof in a predetermined axial position upon the mandrel construction 10.

With the work piece W axially positioned in the desired location, the push block 21 may be urged forwardly by any convenient means such as a lathe push bar, not shown. The radial face 27 moves the fingers 66 and, hence, the transfer member 62 forwardly along the axis of the arbor 31. The contact between the adjacent ends of the transfer member 62 and the rearward one of the sleeves 51 causes a corresponding forward movement of the sleeves 51, which through the coacting surfaces of the toothed ridges 46 and 54, causes radial expansion of the sleeves 51 into firm contact with the periphery of the opening H in the work piece W. As a result, the work piece becomes firmly supported for rotation with the arbor 31.

The work piece W is released by a reversal of the steps detailed above. More specifically, cessation of the forward force of the push block 21 allows said push block 21, the transfer member 62 and sleeves 51 to move rearwardly in response to the resilient contraction restoring force of the sleeves 51.

Although the particular embodiment discussed hereinabove actuates the sleeves by exerting compressive force on the fingers 66, it is contemplated that with reversal of ramps and suitable attachment of the transfer means to the sleeves to be actuated and to suitable actuating means such as a lathe draw bar that expansion of said sleeves can be carried out by tensile forces transmitted through said fingers so that the sleeves would move rearwardly during expansion.

Although particular preferred embodiments of the invention have been disclosed above for illustrative purposes, it will be understood that variations or modifications thereof which lie within the scope of the appended claims are fully contemplated.

The embodiments of the invention in which an exclusive property or privilege is claimed are defined as follows:

1. A mandrel construction for use on a support, the combination comprising:
   a rotatable arbor and at least one radially expandable sleeve telescoped over said arbor;
   coacting means interposed between said sleeve and said arbor effecting radial expansion of said sleeve upon relative axial movement between part of said sleeve and said arbor, and means mounting said arbor with respect to said support;
   reciprocable power means axially movable with respect to said arbor and transfer means transmitting force from said power means to an axial end of said sleeve;
   whereby axial movement of said power means results in axial movement of said sleeve with respect to said arbor and thereby effects radial expansion of said sleeve.

2. The device defined in claim 1, wherein the means mounting said arbor with respect to said support includes a radially outwardly extending means fixed with respect to said arbor for mounting said arbor on said support, said radially extending means lying axially between said power means and said sleeve and having at least one passage therethrough extending between said power means and said sleeve, said transfer means being translatable along said passage for imparting the motion of said power means to said sleeve.

3. In an expandable mandrel the combination comprising:
   an elongated arbor, at least one radially expandable sleeve telescoped over said arbor, coacting ramp means disposed between said arbor and said sleeve for causing expansion of said sleeve in response to axial movement of part of said ramp means in a first direction;
   a reciprocable member substantially coaxial with said arbor with a portion thereof disposed adjacent one end thereof;
   an annular member affixed to and extending radially outward from said arbor and located at least in part axially between said sleeve and said portion of the reciprocable member;
   a plurality of passages in at least one of said annular member and said arbor and directed substantially axially of said arbor;
   a transfer means for expanding said sleeve upon application of an axially directed compressive force thereon in said first direction and having one end portion thereof adapted to abuttingly contact said reciprocable member and the other end portion thereof adapted to abuttingly contact said part of said ramp means, said one end portion comprising a plurality of axially extending fingers slideably disposed in said passages.

4. The device defined in claim 3, wherein said transfer means comprises a cylindrical tubular member with said one end portion comprising a plurality of axially extending circumferentially spaced fingers and with said other end portion comprising a circumferential continuous tubular portion with said fingers being integrally connected thereto.

5. The device defined in claim 3, wherein said part of said ramp means is fixedly connected to said sleeve whereby said sleeve is moved axially by said transfer means.

6. The mandrel construction defined in claim 3 wherein said passages are evenly circumferentially spaced with respect to the axis of said arbor, said passages are substantially identical, said fingers are substantially identical and are equal in number to said passages;
   said fingers have concentrically curved, radially inner and outer circumferential surfaces bounded by side surfaces which converge inwardly at an angle greater than that between radii of said circumferential surfaces;
   portions of said fingers contacting said passages for supporting said fingers;
   whereby said passages allow axial movement of said fingers but prevent movement of said fingers radially and circumferentially of said arbor.

7. The expandable mandrel defined in claim 3 wherein said passages extend axially through said annular member and comprise cylindrical holes of circular cross-section which are disposed radially adjacent the periphery of the arbor;
   said annular member is a radial flange located adjacent one end of said arbor between said sleeve and said reciprocable member;
   said fingers comprise axially extending circumferentially spaced segments of a tubular cylinder and have substantially parallel, circumferentially opposed side walls which are axially slideably supported in said holes by contact between the axial edges of said side walls and the periphery of said holes; and
   said one end portion of said transfer means comprises a circumferentially continuous tubular portion integral with said fingers and lying axially between said fingers and said sleeve, said tubular portion being slideably disposed upon said arbor and being capable of substantially continuously contacting the sleeve around the circumference thereof;

whereby movement of said reciprocable member toward said sleeve results in substantially uniform urging of said sleeve around the circumference thereof.

References Cited

UNITED STATES PATENTS

| | | | |
|---|---|---|---|
| 2,684,854 | 7/1954 | Hohwart | 279—2 |
| 2,859,041 | 11/1958 | Sloan | 279—2 |
| 3,073,610 | 1/1963 | Mackinder | 279—2 |
| 3,117,797 | 1/1964 | Buck | 279—2 |
| 2,734,749 | 2/1956 | Benjamin | 279—2 |
| 2,957,699 | 10/1960 | Dixon | 279—2 |
| 3,076,661 | 2/1963 | Benjamin | 279—2 |
| 3,085,763 | 4/1963 | Floyd. | |

ROBERT C. RIORDON, *Primary Examiner.*

LESTER M. SWINGLE, *Examiner.*

H. V. STAHLHUTH, E. A. CARPENTER,
*Assistant Examiners.*